United States Patent Office 3,492,716
Patented Feb. 3, 1970

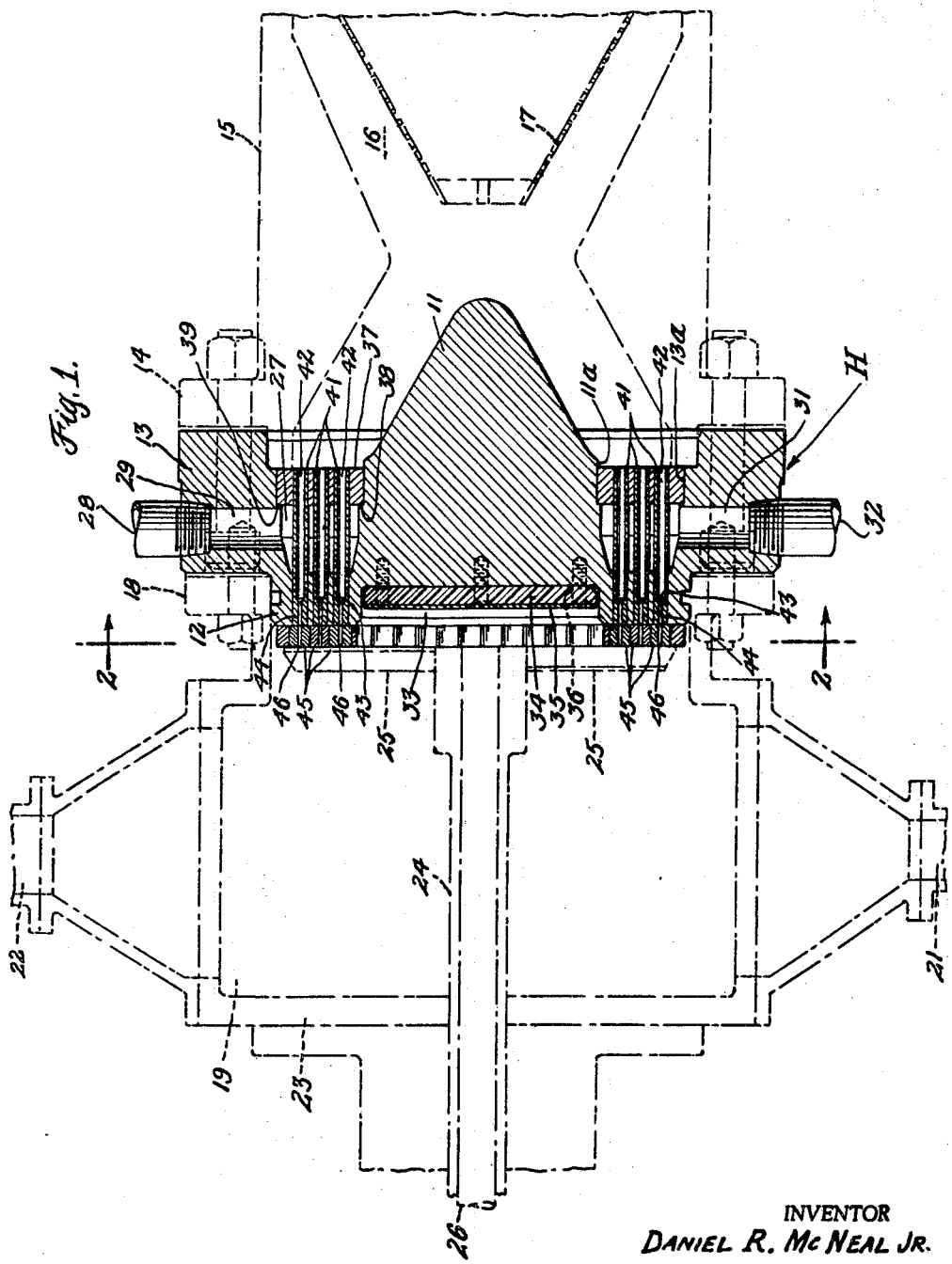

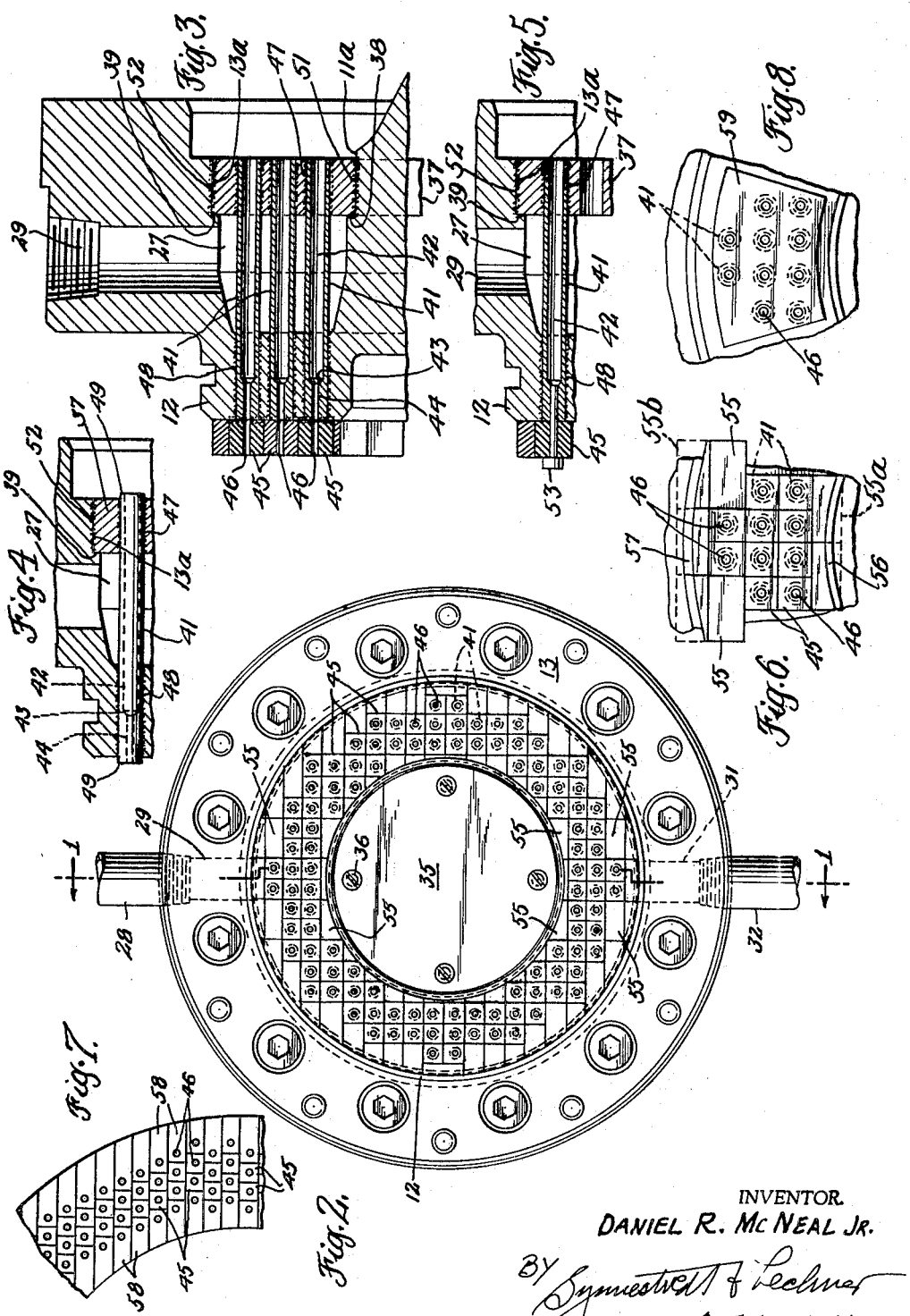

3,492,716
PRODUCTION OF EXTRUDER HEADS
Daniel R. McNeal, Jr., Gwynedd, Pa., assignor to Andale Company, Lansdale, Pa., a corporation of Pennsylvania
Original application Oct. 31, 1966, Ser. No. 590,741. Divided and this application Sept. 20, 1968, Ser. No. 761,070
Int. Cl. B23k 31/02
U.S. Cl. 29—471.3        7 Claims

ABSTRACT OF THE DISCLOSURE

The method disclosed is for the production of a heated extruder head, typically of stainless steel, for use in association with a rotating cut-off blade and adapted to produce plastic pellets, the head being provided with extrusion passages, and, at the exit face wall, having brazed thereon a hard wear-resistant plating, e.g. of tungsten carbide, having apertures in alignment with said passages, said plating being coextensive with the surface area swept by said blade. In the preferred article produced, the head has upstream and exit walls with a hot-fluid interspace, an annular tube plate seated on shoulders formed in the upstream wall, and tubes forming the extrusion passages, the tubes being brazed in apertures in the annular plate and in the exit wall of the head, and said plate being electron-beamed-welded into the upstream wall; and typically the plating is of tiles laid in brick-wall pattern. The disclosure includes a method of producing such extruder heads, which typically comprises the steps of brazing extrusion tubes into holes formed in an annular upstream plate and an exit wall of the head, with the tub-ends protruding, brazing the ring into the head, pressure-testing the assembly, fusion-welding the ring in place, heat-treating the assembly, removing the protruding ends of the tubes, applying a hard plating having apertures and aligning such apertures with the extrusion tubes, brazing said plating to the exit face of the head and to the exit ends of said tubes, cropping off overhanging portions of the plating, and grinding off the plating surface to a plane perpendicular to the axis of the assembly.

---

The present application is a division of my application Ser. No. 590,741, filed Oct. 31, 1966, issued July 1, 1969 as Patent 3,452,394.

This invention relates to the production of extruder heads for use in making pellets of plastic material, i.e., to methods of producing such heads, and the invention is especially useful in the field of extruder heads adapted to be kept hot during operation while discharging the plastic pellets into a cooling bath.

The primary object of the invention is the production of an extruder head of exceptional durability and reliability in service, and adapted for rapid mass extrusion of uniform pellets, involving an improved mode of making it.

The invention further contemplates the production of an improved pellet-extruding head, adapted to operate at high production rates under high temperatures and pressures, whose durability is enhanced by the mode of assembling it.

The invention still further contemplates the production of an improved pellet-extruding head, adapted to operate at high production rates under high temperatures and pressures, whose reliability is enhanced by the mode of assembling it.

How the forgoing and other objects of the invention are achieved will be readily seen after a brief consideration of prior practice in this art. In the making of thermoplastic pellets, which in themselves are the starting material in numerous manufacturing operations, it has been customary to feed the molten thermoplastic polymeric material (for example, polyethylene) to a heated extruder head, under high pressure, for example, 3500 pounds per square inch or more, and indeed the pressure between the feed-screw, or the like, and the upstream face of the extruder head may temporarily rise to more than double that figure, or to a value of about 8,000 pounds per square inch, in some instances. In addition to being subjected to high pressures, the extruder head, of the internally-heated type is subjected to temperatures ranging from about 550° F., at the upstream face, to perhaps 200° F., at the downstream face, in the case of a head which discharges directly into a water bath or stream.

With such extruder heads, sometimes called underwater pellet heads, it has become the practice to form the head with an annular chamber which is in part defined by upstream and downstream walls, these two walls serving as tube plates for an annular bundle of extrusion tubes, each tube being secured in aligned holes in said plates. The hot plastic is forced through these tubes and the tubes are kept heated by a suitable fluid, such as superheated steam, which is circulated through said annular chamber. Where steam is used, it may be at a pressure of the order of 600 pounds per square inch. As the hot plastic is extruded through the tubes, and emerges continuously from the exit ends thereof, it is chilled by the water stream at the exit face of the head, and at that point a rapidly-rotating blade (or set of blades) which is in contact with the exit face of the head cuts off the solidified plastic in the form of small bits or pellets.

It will be readily apparent that the wear on the exit face of the extruder head, as the rotating blade cuts off the extruded material, has presented a very great problem. Neglecting other factors, this one alone has seriously shortened the life of the known extruder heads.

It will also be apparent that the high pressures and temperatures encountered, and the substantial pressure and temperature differentials between the upstream and downstream portions of the head, have presented severe problems in the manufacture and maintenance of the known extruder heads. It has been difficult to make and keep them completely fluid-tight. It has been a problem to avoid distortion of various parts, such for example as tubes and tube plates and their areas of juncture, during the assembling thereof, because of heating, brazing, quenching and tempering requirements; and also a problem to prevent distortion, or even rupture, of parts of the assembly during operation, because of the severe temperature and pressure conditions prevailing.

The cut-off blades themselves must be made quite hard, if excessive wear thereof is to be avoided—even though they are more readily and cheaply replaced than the extruder head—but the exit face of the head must be still harder, and this has presented a difficult problem, since a tube-plate of adequate hardness per se would not ordinarily have adequate strength; or, if it be hardened at the face only, its life in service is usually too short to be practicable.

The method of the present invention, and the article produced, have the advantage of eliminating or substantially minimizing the above problems of the prior art, as will appear from the following description, taken with the accompanying drawings.

FIGURE 1 is a section—typically a vertical section—of an extruder head produced by the method of the present invention, taken as indicated by the arrows 1—1 in FIGURE 2, and showing in dot-and-dash lines adjacent portions of the extruder.

FIGURE 2 is an elevational view, to a larger scale, of the extruder head of FIGURE 1, taken as shown by the arrows 2—2 in FIGURE 1.

FIGURE 3 is an enlarged fragmentary section, similar to FIGURE 1, of the upper portion only of the head, and indicating, by stippling, certain fusion welds and brazed connections hereinafter described.

FIGURE 4 is a similar fragmentary section showing only one of the extrusion tubes, this being illustrated in elevation, at an early stage of the assembly procedure.

FIGURE 5 is a similar view, but with the tube in section, illustrating a succeeding stage of assembly.

FIGURE 6 is a fragmentary face view taken from the left of FIGURE 3, showing another succeeding stage of assembly, illustrating one form of tungsten carbide tiling in position and brazed onto the head, including tiles which extend beyond the inner and outer peripheries of the face plate, the dot-an-dash lines indicating portions of the tiles which are removed after the brazing operation.

FIGURE 7 is a fragmentary face view of the tiling as applied to the face plate of the head, in an arrangement which may be termed a brick wall pattern, where the tile joints are placed in staggered relation to each other. In this view the tiles are shown as they appear after cutting off the overhang thereof at the inner and outer peripheries of the face plate.

FIGURE 8 is a fragmentary detail, similar to FIGURES 6 and 7, but showing a construction in which the tile is formed as a segment of a circular member, and covers an area embracing several of the extrusion tubes.

In FIGURE 1 the main head member H is shown as comprising a central conical structure 11, either solid or hollow, facing in an upstream direction, a main face plate structure 12 at the downstream side, and a heavy peripheral bolting ring 13.

At the upstream side, the ring 13 is adapted to cooperate with the bolting flange 14 of the main casing 15 of the extruder. The parts 14 and 15, and other environmental structure, are shown in dot and dash lines. Within the chamber 16 is disposed a mixing and distributing screen 17 through which the hot polymeric material is forced by an extruder screw or other force-feed means, not shown, but common to the art.

At the downstream side of the main bolting ring 13 there is secured a bolting flange 18 of a structure forming the cooling chamber 19 into which chamber the extruded material is delivered. The chamber 19 has a cooling water inlet 21 and a discharge outlet 22. Where the material being extruded is a light-weight material, for example a plastic having a density of less than 1, e.g., polyethylene, the water inlet to the chamber 19 will be at the bottom of the apparatus, as shown, and the water outlet will be at the top, so that the circulating stream will tend to carry off the extruded pellets in the direction in which they tend to float.

Through a wall 23 of the water chamber there passes a hollow shaft 24 of a set of cut-off blades 25, which latter cooperate with the extruder head in a manner hereinafter described. The shaft 24 is slidably mounted on the shaft 26, so that the contact of the blades 25 with the extruder head structure may be very accurately regulated. This is necessary for the close and accurate cutting off of the extruded material to form the pellets which are the ultimate product of the extrusion operation. If desirable or necessary, the bearing of the blades 25 upon the extruder head may be regulated by a yielding pressure device such as spring means, not shown.

Turning again to the extruder head itself, while the conical structure 11 may be internally hollowed out, it may also be made solid, as shown. It, and other parts of the head, are kept heated so that the hot material being handled is not chilled or solidified in the extruder tubes, later described. The heating may be done by passing super-heated steam into the annular chamber 27 by means of an inlet pipe 28 and the bore 29. The steam is discharged from chamber 27 by the bore 31 and the outlet pipe 32. Typically, the steam will be under a pressure of about 600 p.s.i., having a temperature of 490° F. To minimize cooling of the head structure by the water passing through the chamber 19, the central portion of the head structure, on the downstream side, may have a recess 33 which is partially filled with an insulating material, such as a "Transite" disc or a "Teflon" disc 34, which may be held in place by a retainer plate 35 having fastening screws 36.

In place of steam, the extruder head may be heated by hot oil, or by the product available under the trademark "Dow-therm" which boils at temperatures above about 550° F.

The annular chamber 27 is defined at the downstream side by the main or face plate 12 of the extruder head. The upstream side of said chamber is defined by a core ring 37 which is seated on inner and outer peripheral shoulders 38, 39 of the head structure.

The extrusion passages are provided by a bundle of tubes arranged in an annular pattern. Each tube 41 extends from the upstream face of core ring 37 to the downstream face of plate 12. The parts 12 and 37 thus serve as tube plates. Each tube 41 may be formed from a rod which is drilled to form the tube. As a typical example, the tube may have an internal diameter of about .22 of an inch as shown at 42, from its inlet end to a point about half way through the plate 12, and then be tapered, as shown at 43, at an angle, for example 30°, to an outlet bore 44 of smaller diameter, for example about .11 of an inch. These tubes may initially have a greater length than shown in FIGURE 1, as will be described later with reference to FIGURE 4.

As the spaghetti-like material emerges from the exit ends of the tubes it must be cut off, so as to form small bits or pellets of a size suitable for ultimate use in various manufacturing processes. In the art, it has been known to have cut-off blades rotating over the downstream face of the head, for example at about 3,000 r.p.m. The rapid rotation of the blades and the action thereof in cutting off the plastic material has been a cause of great wear and difficulty in operation.

The present invention contemplates novel assembly techniques, dealing, inter alia, with the provision of extremely hard tiles or wear members 45, at the exit face of plate 12, each with a bore 46, of the same diameter as, and accurately aligned with, the bore 44 of a tube 41, especially in combination with features of the associated parts as involved in my copending patent application 590,741.

In the production of the extruder head, as so far described, the configuration and assembly of the parts are very significant, with respect to the accuracy, reliability and durability of the structure as a whole. It is essential, considering the pressures involved, that the extrusion tubes and the tube plates be very accurately and very tightly secured in place, so that they will not provide any risk of leakage, either of the plastic or of the heating fluid or of the cooling water. The assembly must also be substantially free of distortion during manufacture and in service. The exit face of the tiled surface must be a true plane and must be accurately perpendicular to the axis of rotation of the cut-off blades 25.

The sealing of the core ring where it seats at its inner and outer peripheries with the main structure of the head must be strong and absolutely tight. The tile facing must be capable of being ground and reground, as wear takes place. Since the head itself is a more complex and expensive part of the apparatus than are the cut-off blades, it must be more durable, and must have an exceptionally hard facing where the blades rotate over the surface.

In producing the extruder head by the method of the present invention, the main head structure H and the core ring 37 are preferably forged from stainless steel, for example #410 or #17-4PH, and the tubes 41 are also of the same material. The rotating blades 25 which cut off the plastic pellets are of a hard steel such as 440-C stainless. The rotation of these blades over the downstream face of the extruder head and over the outlet ends of the tubes ordinarily causes very rapid wear of the head including the tubes, and to avoid this it has heretofore been proposed to flame-plate the surface of the head; but that is at best a stop-gap solution to the wear problem, since the hard wear surface is extremely thin, being only about ten or fifteen thousandths of an inch thick, and it is readily gouged or otherwise badly worn in service, so that the head is soon of little or no further value.

In carrying out the method of the present invention, a layer of exceptionally hard material of substantial thickness is provided at the downstream face of the head. This is preferably made of tungsten carbide, silicon carbide, or "Stellite" alloy or other suitable material, which must be substantially harder than the steel of which the cut-off blades are made.

In assembling the head with a layer of material, such as tungsten carbide, considerable difficulties are encountered, because of the differences in the materials which are being secured together, and because of the necessity that the tungsten carbide, which is a pressed and sintered granular material, having a frangible nature similar to a ceramic, must be so firmly secured in place that it isn't easily chipped or broken off. There is also the problem of securing absolutely fluid-tight joints between the core ring 37 and the main body of the head H, and between the tubes 41 on the one hand and the members 37 and 12, constituting the tube plates, on the other hand.

Additionally, the apertures through the hard facing must be accurately aligned with the discharge apertures 44.

Furthermore, in order to strengthen the assembly, and to avoid excessive internal stresses, it is necessary to subject the parts to various heating and cooling operations. Some of the heating operations must be designed to provide the proper temperatures for brazing certain of the joints, and others to provide for the final hardening, without disturbing or loosening the brazing, and this again presents substantial problems in manufacture.

According to the present invention the core ring 37 is fitted snugly between the central structure 11 and the flange structure 13 and supported on the seats 38 and 39 (as best seen in FIGURES 1 and 3). With these parts so located, a multiplicity of holes, arranged in a generally annular pattern (as indicated in FIGURES 1 and 2) is then drilled through the core ring 37 and the downstream wall 12 of the head. These holes are of a diameter to form a snug fit with the outside walls of the tubes 41, so as to facilitate the making of tight bonded joints between said tubes and the tube plates formed by the core ring 37 and the wall structure 12. Alternatively, the holes in the core ring and head can be drilled separately, in advance of assembly, using a jig-drilling technique.

When performing the brazing operation, the tubes are inserted in the holes of the head, with the head axis vertical. Brazing material is then placed in the cavity 27. The core ring is then slipped into place, over the upstream ends of the tubes, and brazing material is placed at the upstream face of the core ring. Each tube is preferably initially of a length slightly exceeding the measurement from the upstream face of the core ring to the downstream face of the wall 12 so that the tubes protrude slightly at each end as shown at 49 in FIGURE 4. This assembly is then heated to about 1950° in an atmosphere which is inert with respect to the process (for example, hydrogen), the temperature depending upon the brazing material and the subsequent heat treating requirements. The tubes and core ring are then brazed in place—preferably being copper-brazed.

The brazing of the tubes is shown at 47, 48 in FIGURE 4. At this stage, pressures testing is conducted, to make certain that the tube joints are tight.

In order to minimize distortion and loosening of the assembly, under the extremes of temperatures and pressures, and of changes in temperatures and pressures, encountered during service, and also in order to make and preserve fluid-tight connections, it is important that the core ring 37 be fastened very securely in place with fluid-tight joints. It is for this reason that the ring is inserted from the upstream side of the head, and the shoulders 38 and 39 to provide a firm support for the core ring under the immense pressures developed on the upstream side. To the same end, the core ring is fitted at its inner and outer peripheries against cylindrical surfaces 11a and 13a of structures 11 and 13.

After the brazing and pressure testing of the assembly, as above described, it is then heat treated, for suitable ductility preparatory to welding. Thereafter, the peripheries of the core ring (where previously brazed) are fusion-welded to the cylindrical surfaces 11a and 13a, preferably by electron-beam-welding, indicated at 51 and 52 in FIGURES 3 to 5.

Even though the temperature of such welding is much higher than the temperature which would melt the brazing 47 and 48 which interconnects the tubes with the core ring 37 and with the downstream plate 12, this heating is so localized that there is no damage to or disturbance of the brazed connection of the tubes.

The assembly is then preferably cooled and reheated to about 1100° F. to produce a hardness of 260-320 Brinell. The assembly may then again be coled; and the protruding ends 49 of the tubes are machined off, and if there are irregularities of the assembly at this stage, the machining, or a grinding operation, may be carried on to the point where the upstream face of core ring 37 and the downstream face of wall 12 are quite smooth and parallel with each other.

The next step is to assemble the multiciplicity of tungsten carbide tiles, for example, one tile for each tube 41. The tiles for the individual tubes are shown as small square blocks or cubes 45, each apertured at 46. The apertures or holes 46 are formed, for example, by a tool known as an "Elox" driller, which utilizes a consumable electrode—the tungsten carbide being too hard to be drilled by ordinary means and also too frangible. These holes 46 must also be no smaller than the outlet bores 44 of the tubes 41, and preferably very close to the same diameter as said bores 44. The bores 44 and 46 must of course be aligned, and this has to be done before the tiles are actually secured in place. The alignment is accomplished by headed carbon pins 53 (see FIGURE 5). These pins also prevent the braze alloy from filling the tube holes.

In a typical arrangement, as shown in FIGURES 2 to 6, the tubes, and accordingly the tungsten carbide tiles 45, are arranged in rows, the tiles being in side-by-side contact, or nearly so, and individually aligned in directions at right angles to each other as seen in the face view of FIGURE 2. It will be seen from that figure, and the somewhat enlarged detail of FIGURE 6, that this pattern leaves certain inner and outer peripheral areas of the downstream face wall 12 uncovered by the apertured tiles. These areas are preferably covered by other, unpierced, tiles 55, which, for convenience, may be formed as oblongs having a face area twice that of one of the square tiles 45. These tiles 55 when first in place, will extend beyond the inner and outer peripheral edges 56 and 57 of the plate 12, as seen in FIGURE 6.

When the tiles 45 are all in place, and positioned by the pins 53, and the tiles 55 are also in place, they are secured by a copper or silver brazing operation, and for this purpose the assembly must be reheated. For example, with a silver brazing material, the assembly may be heated to about 1650° F. For a copper braze, the temperature would be higher, for example about 1950° F. The tiles are directly brazed to the face of plate 12 and also to each other at their abutting edge surfaces.

After cooling, the carbon pins 53 are removed, and the overhanging areas 55a and 55b of the tiles 55 are trepanned, or cropped, for example by electrical-discharge machining, as by an "Elox" tool. After these operations, the face surface of the tiles may be ground off to be accurately perpendicular to the axis of the shaft 24. This also eliminates possible humps which might be left by differences in the thickness of the tiles or by virtue of different quantities of the brazing material between the tiles and the plate 12.

The whole assembly is heated to about 1850° or 1900° F. for hardening and subsequent tempering. This heating can be somewhat above the brazing temperature without damaging the brazing.

As an alternative to the arrangement of the tiles shown in FIGURES 2 to 6, the tiles may be laid up in a "brick wall pattern" as shown in FIGURE 7. This of course requires that the plate 12 and the core ring 37 have their holes drilled in a pattern which will align the tubes 41 with the tiles 45 as shown. In this case, some of the apertured tiles 45 will be the same as the tiles in the first embodiment, but other tiles 58—both at the inner and outer peripheries of the assembly, will be of varying lengths, and will themselves be apertured as shown. This arrangement appears to give greater stability to the assembly than the arrangement shown in FIGURES 2 to 6, especially during the brazing.

Instead of having a separate tile for every individual tube, the assembly may be made up of a series of segmental tiles shown at 59 in FIGURE 8, each of these segments being associated with a group of tubes 41.

The technique of applying and finishing off the tiles, in the assembly of FIGURE 7 or of FIGURE 8, is similar to that involved in the assembly of FIGURES 2 to 6.

Whether segmental tiles are used (as in FIGURE 8) or square and oblong tiles, trimmed off (as in FIGURE 7 or FIGURES 2 to 6), it is desirable that the overall tile face should be a fairly accurate annular surface, conforming with the surface area swept by the cut-off blades, to avoid any tendency for the blades, during their high-speed operation, to chip off or otherwise damage the edges of the tiles or to dislodge them.

As wear of the tiles takes place, this may be somewhat uneven. Furthermore, the cut-off blades may wear off unevenly, and of course they wear faster than the tiles because they are not as hard. Thus, when cut-off blades are replaced, they may not seat squarely on the tile face. Accordingly, the tile face should be ground off from time to time to a new flat surface, perpendicular to the axis of shaft 24. For this reason, the tiles when applied are of substantial thickness, for example 1/8".

An extruder head configured and assembled in the manner hereinabove described has been found, in actual service, to maintain a fluid tight condition at all the joints and connections where this is significant. This head also preserves accurate contours under widely varying temperature and pressure conditions, and it outlasts other heads, especially those which have heretofore been made with flame hardened steel cut-off surfaces, to such an extent that the added cost involved in certain features of construction and assembly of the present head is saved many times over by the long life of the head produced by this method.

I claim:
1. The method of producing a fluid-heated head for making plastic pellets, from a body member which has an extrusion exit face wall with tube-receiving holes, an inner wall with an annular aperture, and an intermediate heating chamber of generally annular form, a ring with tube-receiving holes, a set of extrusion tubes, and apertured wear-plate means, which comprises: securing the tube exit ends in the holes of said face wall in fluid-tight relation and the tube entrance ends in the holes of said ring in fluid-tight relation; fusion-welding said ring in said annular aperture of the inner wall; and integrally bonding said wear-plate means exteriorly of said extrusion exit face wall with said apertures aligned respectively with the respective bores of the extrusion tubes.

2. The method of claim 1, together with the step of grinding the exposed face of said wear-plate means to a smooth finished surface perpendicular to said tubes.

3. The method of claim 1, comprising also the insertion of aligning pins in apertures of the wear-plate means and in tube bores to align said apertures and bores prior to the bonding of said wear-plate means in place.

4. The method of claim 1, wherein the tube ends are secured by brazing in the holes of said wall and in the holes of said ring.

5. The method of claim 4, wherein said ring is brazed to the peripheral surfaces of said annular aperture of the inner wall prior to being fusion-welded in place, and wherein the assembly is then pressure-tested, after which the fusion welding is done, and then said wear-plate means are brazed onto extrusion exit face wall.

6. The method of claim 1, wherein, upon initial assembly, the tube ends project beyond the exit surface of said face wall and beyond the inlet surface of said ring, respectively; and wherein, after securing of the tubes in place, their projecting ends are removed, and thereafter said wear-plate means are integrally bonded to said extrusion exit face wall and to the tubes, with said apertures aligned respectively with the respective bores of the extrusion tubes.

7. The method of producing a fluid-heated head for making plastic pellets, from a body member which has an extrusion exit face wall with an annular area having tube-receiving holes, an inner wall with an annular aperture, and an intermediate heating chamber of generally annular form, a ring with tube-receiving holes, a set of extrusion tubes arranged in an annular group, and wear-plate means comprising tungsten carbide blocks or the like, at least some of which are apertured, which method comprises: securing the tube exit ends in the holes of said face wall in fluid-tight relation and the tube entrance ends in the holes of said ring in fluid-tight relation; fusion-welding said ring in said annular aperture of the inner wall; laying said blocks on said annular area of said exit face wall with certain peripheral blocks projecting beyond a peripheral edge of said annular area; integrally bonding said blocks on said annular area of the extrusion exit face wall with said apertures aligned respectively with the respective bores of the extrusion tubes; and cropping the projecting portions of said blocks.

References Cited

UNITED STATES PATENTS 2,443,577  6/1948  Finlay _____ 29—500
2,759,219  8/1956  Meakin.
3,271,822  9/1966  Rhino.

JOHN F. CAMPBELL, Primary Examiner
RICHARD BERNARD LAZARUS, Assistant Examiner

U.S. Cl. X.R.
29—497